US012811378B2

(12) United States Patent
(10) Patent No.: US 12,811,378 B2
(45) Date of Patent: Nov. 24, 2026

Mitsuhashi et al.

(54) ELECTRICAL CONNECTION BOX CONTAINING A RELAY TERMINAL CONNECTING TO A BUS BAR WITH VIBRATION DAMPING

(71) Applicants: YAZAKI CORPORATION, Tokyo (JP); TOYOTA JIDOSHA KABUSHIKI KAISHA, Aichi-ken (JP)

(72) Inventors: Yoshitake Mitsuhashi, Kakegawa (JP); Jo Naito, Kakegawa (JP); Nobuyuki Oka, Kakegawa (JP); Kozue Yorifuji, Fuji (JP); Akinori Goto, Sunto-gun (JP); Satoru Ishikawa, Sunto-gun (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 318 days.

(21) Appl. No.: 18/887,008

(22) Filed: Sep. 16, 2024

(65) Prior Publication Data

US 2025/0105605 A1 Mar. 27, 2025

(30) Foreign Application Priority Data

Sep. 21, 2023 (JP) ................................ 2023-154107

(51) Int. Cl.
*H02G 3/08* (2006.01)
*H01R 4/48* (2006.01)
(Continued)

(52) U.S. Cl.
CPC ............. *H02G 3/088* (2013.01); *H01R 4/485* (2023.08); *H01R 4/4881* (2013.01); *H01R 4/5066* (2013.01); *H01R 13/533* (2013.01); *H01R 33/975* (2013.01); *H02G 3/081* (2013.01); *H02G 3/16* (2013.01); *H02G 5/08* (2013.01);
(Continued)

(58) Field of Classification Search
CPC .......... H02G 3/088; H02G 3/081; H02G 3/16; H02G 5/08; H01R 13/533; H01R 33/975; H01R 4/485; H01R 4/4881; H01R 4/5066; H01R 33/7664; H01R 4/48; H01R 4/4846;
(Continued)

(56) References Cited

U.S. PATENT DOCUMENTS

2010/0271763 A1* 10/2010 Kodama .................. H02G 3/32
361/679.01

FOREIGN PATENT DOCUMENTS

JP 2010-259228 A 11/2010

* cited by examiner

*Primary Examiner* — Justin M Kratt

(74) *Attorney, Agent, or Firm* — KENEALY VAIDYA LLP

(57) ABSTRACT

An electrical connection box includes: a bus bar that includes a bus bar base portion having a flat plate shape and a bus bar terminal connection portion having a male tab shape erected from the bus bar base portion; a relay component in which a relay terminal connection portion is provided; a relay terminal fitting that physically and electrically connects the bus bar terminal connection portion and physically and electrically connects the relay terminal connection portion; and a housing that houses the bus bar, the relay component, and the relay terminal fitting. The housing includes a case member in which a bus bar housing chamber that houses the bus bar is formed, and a cover member that covers the bus bar and the case member. At least one vibration damping portion that damps vibration accompanying driving of the relay component is provided in the bus bar.

10 Claims, 11 Drawing Sheets

(51) Int. Cl.
*H01R 4/50* (2006.01)
*H01R 13/533* (2006.01)
*H01R 33/975* (2006.01)
*H02G 3/16* (2006.01)
*H02G 5/08* (2006.01)
*H01R 33/76* (2006.01)

(52) U.S. Cl.
CPC .............. *H01R 4/48* (2013.01); *H01R 4/4846* (2023.08); *H01R 4/4854* (2013.01); *H01R 4/4863* (2013.01); *H01R 4/5083* (2013.01); *H01R 33/7664* (2013.01)

(58) Field of Classification Search
CPC ... H01R 4/4854; H01R 4/4863; H01R 4/5083
See application file for complete search history.

ELECTRICAL CONNECTION BOX CONTAINING A RELAY TERMINAL CONNECTING TO A BUS BAR WITH VIBRATION DAMPING

CROSS-REFERENCE TO RELATED APPLICATION(S)

The present application claims priority to and incorporates by reference the entire contents of Japanese Patent Application No. 2023-154107 filed in Japan on Sep. 21, 2023.

BACKGROUND OF THE INVENTION

1. Field of the Invention

The present invention relates to an electrical connection box.

2. Description of the Related Art

A bus bar is housed in a housing of an electrical connection box such as a junction box, and electrically connects at least two electrical connection target components. The bus bar is, for example, a plate-like conductive member press-molded using a metal plate as a base material, and includes a terminal connection portion formed in a male tab shape to which the electrical connection target component is directly or indirectly connected. An electrical connection box including this type of bus bar is disclosed in Japanese Patent Application Laid-open No. 2010-259228 A.

Meanwhile, in a case where the electrical connection target component is a relay component that can be an excitation source, vibration accompanying driving of the relay component is transmitted to the terminal connection portion of the bus bar, and the vibration is propagated from the terminal connection portion as a starting point. The bus bar is housed in the housing of the electrical connection box with a certain degree of play (slack), which may lead to abnormal noise caused by vibration of the bus bar. The bus bar may be electrically connected to the relay component via a relay terminal fitting. In this case, the relay terminal fitting indirectly connects the male tab-shaped terminal connection portion of the bus bar to a male tab-shaped terminal connection portion of the relay component. Here, when the relay terminal fitting physically and electrically connects the terminal connection portions by using a spring force, it is desirable that the relay terminal fitting absorbs and damps the vibration accompanying the driving of the relay component. However, the vibration may be amplified by the relay terminal fitting and transmitted to the terminal connection portion of the bus bar.

SUMMARY OF THE INVENTION

Therefore, an object of the present invention is to provide an electrical connection box capable of suppressing vibration of a bus bar.

In order to achieve the above mentioned object, an electrical connection box according to one aspect of the present invention includes a bus bar that includes a bus bar base portion having a flat plate shape, and a bus bar terminal connection portion having a male tab shape erected from the bus bar base portion; a relay component in which a relay terminal connection portion is provided; a relay terminal fitting that physically and electrically connects the bus bar terminal connection portion, and that physically and electrically connects the relay terminal connection portion; and a housing that houses the bus bar, the relay component, and the relay terminal fitting, wherein the housing includes a case member in which a bus bar housing chamber that houses the bus bar is formed, and a cover member that covers the bus bar and the case member, at least one vibration damping portion that damps vibration accompanying driving of the relay component propagated to the bus bar base portion via the bus bar terminal connection portion is provided in at least one of the bus bar and the housing, and the bus bar base portion is sandwiched between the case member and the cover member via the vibration damping portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an electrical connection box according to the present invention will be described in detail with reference to the drawings. Note that the present invention is not limited by the embodiment.

Embodiment

One embodiment of an electrical connection box according to the present invention will be described with reference to FIGS. 1 to 13.

Figure 1:
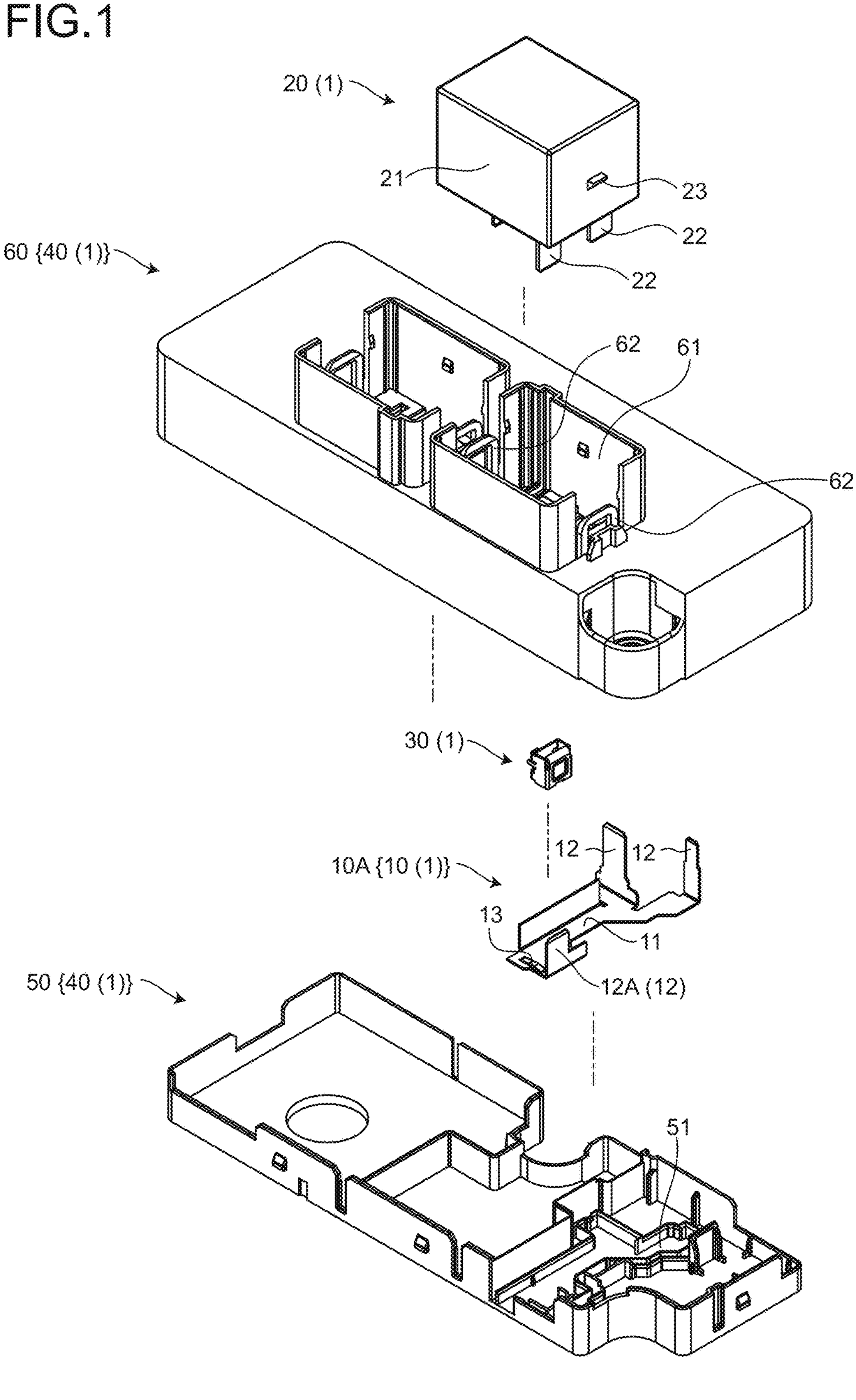
FIG. 1 is an exploded perspective view for describing an electrical connection box of an embodiment.
Figure 2:
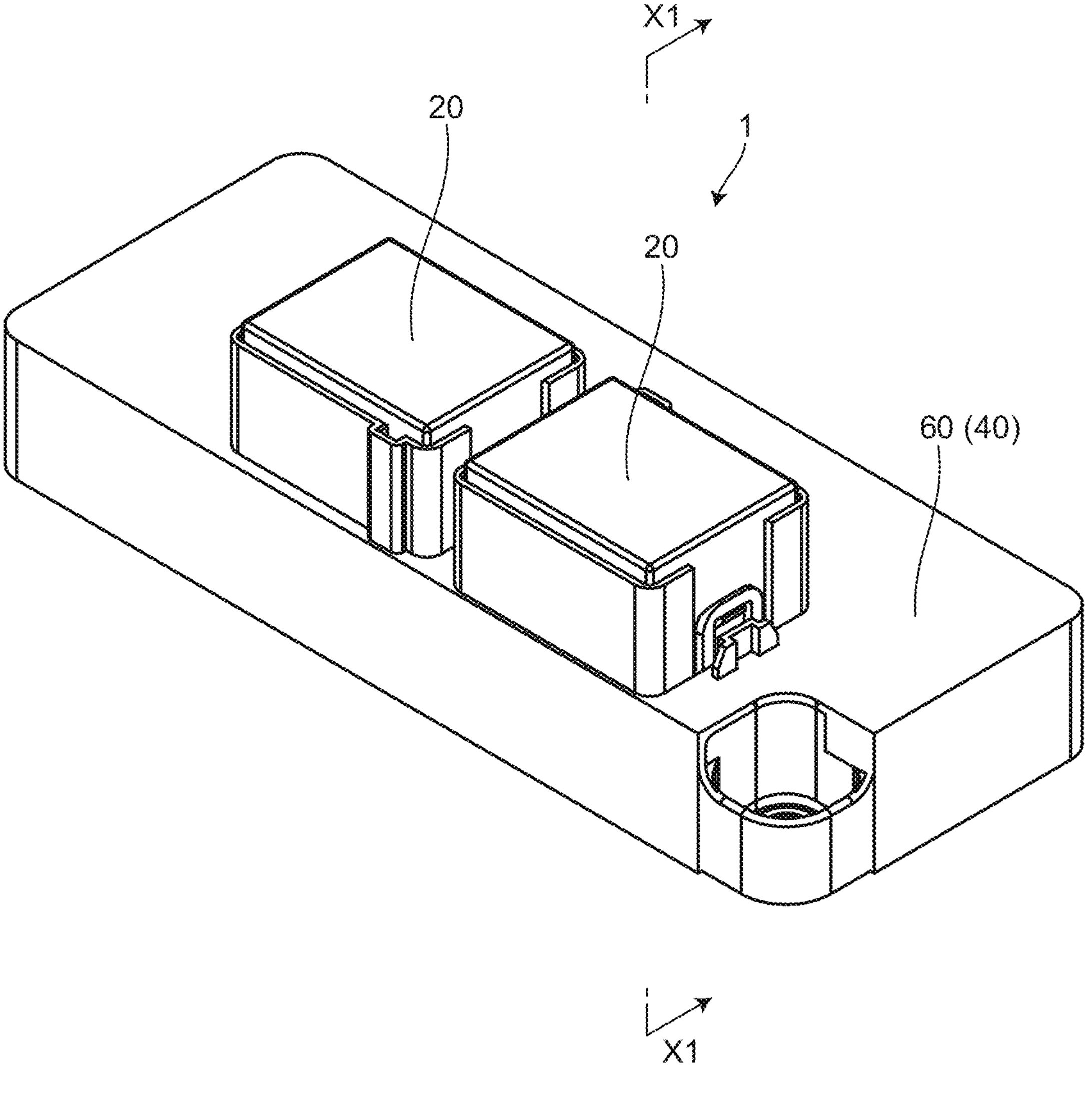
FIG. 2 is a perspective view for describing the electrical connection box of the embodiment.

Reference Numeral 1 illustrated in FIG. 1 indicates an electrical connection box of the present embodiment. The electrical connection box 1 is referred to as a junction box or the like, and electrically connects at least two electrical connection target components. The electrical connection box 1 includes a bus bar 10, a relay component 20 as an electrical connection target component, a relay terminal fitting 30 interposed between the bus bar 10 and the relay component 20, and a housing 40 that houses these components (FIGS. 1 and 2). In the electrical connection box 1, the relay component 20 is electrically connected to another electrical connection target component via the bus bar 10 and the relay terminal fitting 30 (FIG. 1).

Figure 3:
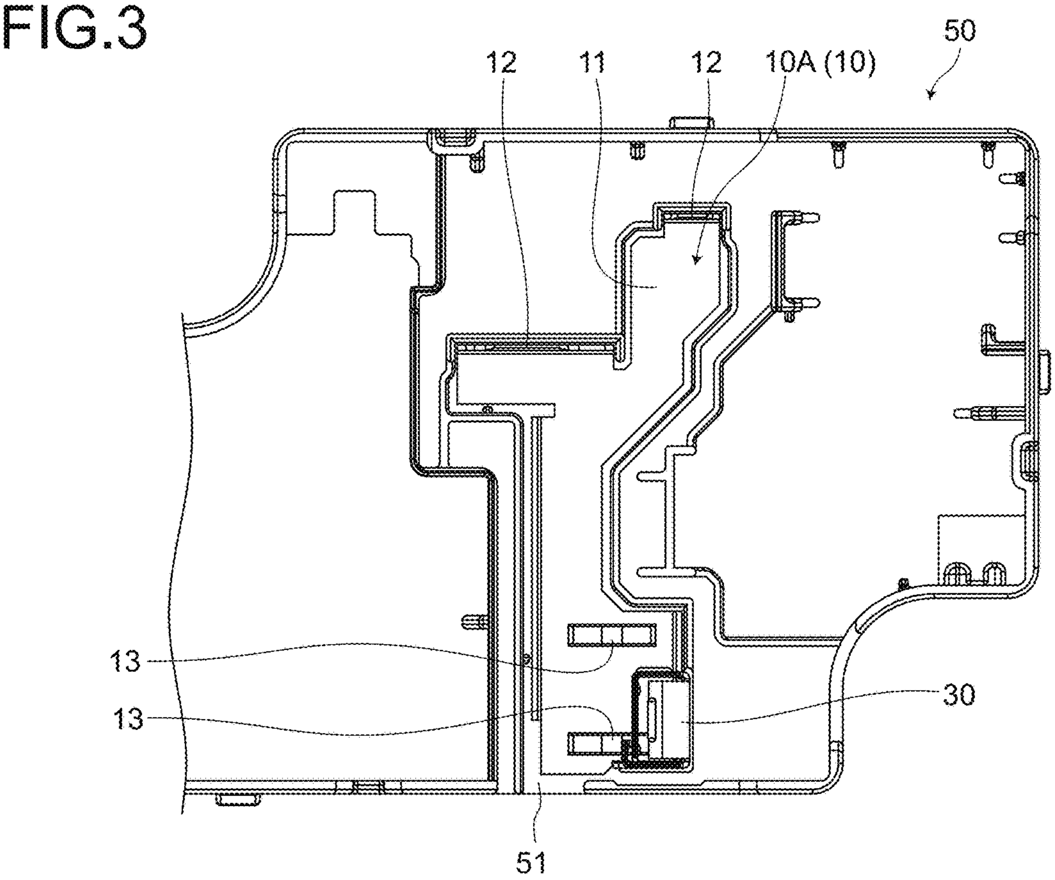
FIG. 3 is a plan view illustrating a bus bar and a relay terminal fitting housed in a bus bar housing chamber.

The bus bar 10 is a conductive member formed in a plate shape and formed of a conductive material such as a metal material. For example, the bus bar 10 is press-molded using a metal plate as a base material. The bus bar 10 includes a flat plate-shaped base portion (hereinafter, referred to as a "bus bar base portion") 11 and a male tab-shaped terminal connection portion (hereinafter, referred to as a "bus bar terminal connection portion") 12 erected from the bus bar base portion 11 (FIGS. 1 and 3). The bus bar 10 illustrated here includes a plurality of bus bar terminal connection portions 12, and the relay component 20 is electrically connected to one (hereinafter, referred to as a "bus bar terminal connection portion 12A") of the plurality of bus bar terminal connection portions 12 via the relay terminal fitting 30 (FIGS. 1, 3, and 4).

Here, the relay component 20 includes a relay body 21 and a terminal connection portion (hereinafter, referred to as a "relay terminal connection portion") 22 protruding from the relay body 21 (FIG. 1). A relay terminal connection portion 22 formed in a male tab shape is provided in the relay component 20 illustrated here.

Figure 4:
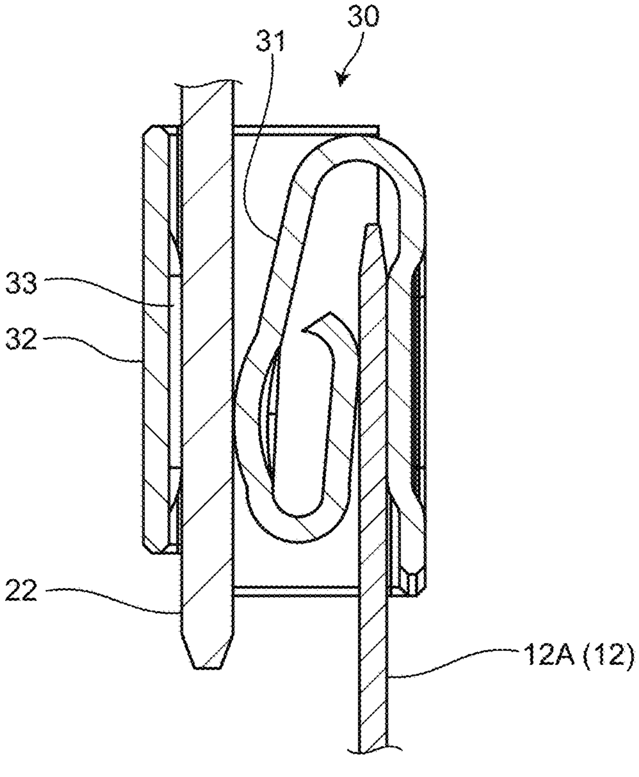
FIG. 4 is a cross-sectional view of the periphery of the relay terminal fitting in a cross section taken along line X1-X1 of FIG. 2.
Figure 5:
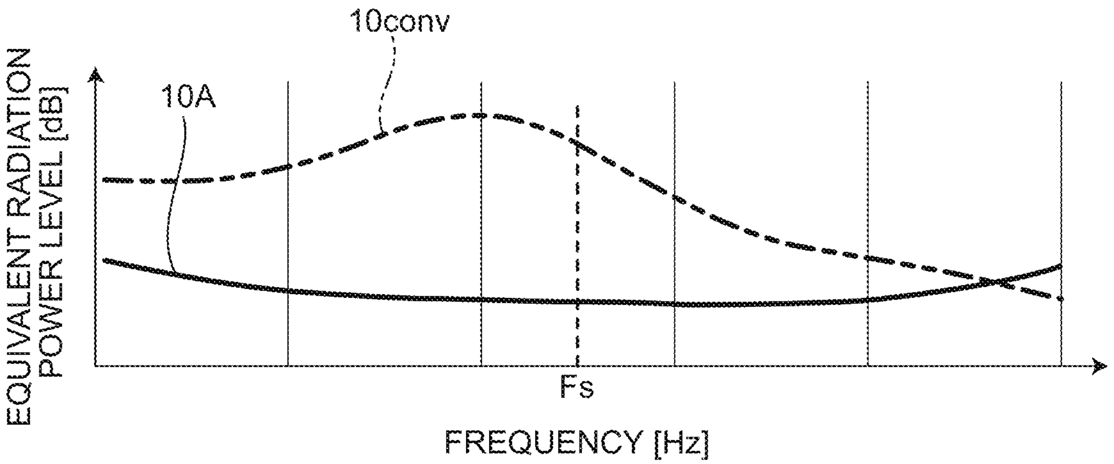
FIG. 5 is a diagram illustrating an example of a simulation analysis result of an equivalent radiation power level related to the bus bar in which a vibration damping portion is provided.
Figure 6:
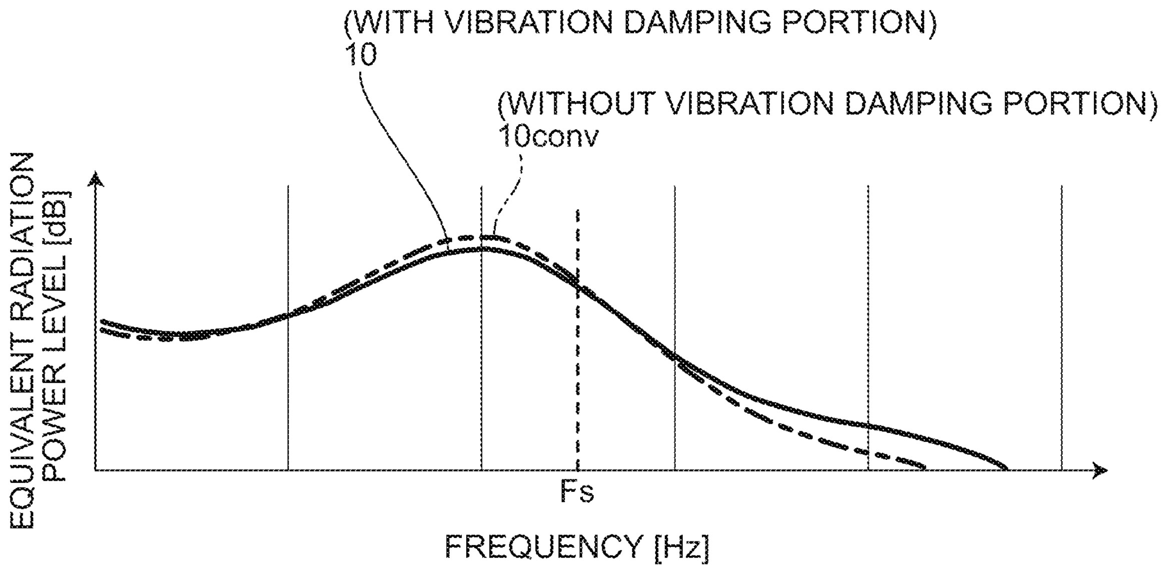
FIG. 6 is a diagram illustrating another example of the simulation analysis result of the equivalent radiation power level related to the bus bar in a case where the vibration damping portion is provided in a cover member.
Figure 7:
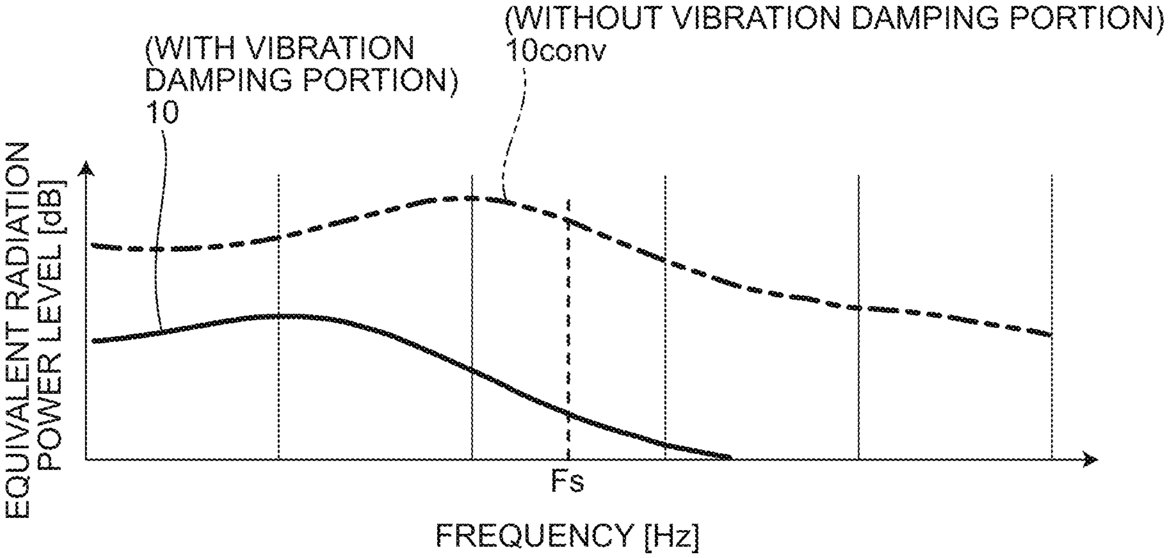
FIG. 7 is a diagram illustrating another example of the simulation analysis result of the equivalent radiation power level related to the bus bar in a case where a vibration damping portion of another form is provided in a cover member.

In addition, the relay terminal fitting 30 includes an electrical connection portion 31 that physically and electrically connects the bus bar terminal connection portion 12A and physically and electrically connects the relay terminal connection portion 22, the electrical connection portion 31 being provided in a cylinder of a cylindrical terminal body 32 (FIG. 4). Therefore, the bus bar terminal connection portion 12A is electrically connected to the relay terminal connection portion 22 via the relay terminal fitting 30. The relay terminal fitting 30 illustrated here is press-molded using a metal plate as a base material.

The electrical connection portion 31 is bent and deformed as the bus bar terminal connection portion 12A is inserted, and a reaction force (spring force) thereof is applied to a flat surface of the bus bar terminal connection portion 12A to clamp the bus bar terminal connection portion 12A between the electrical connection portion 31 and an inner wall surface of the terminal body 32 (FIG. 4). Therefore, the bus bar terminal connection portion 12A is physically and electrically connected to the relay terminal fitting 30 by the spring force of the relay terminal fitting 30 applied to the flat surface. In addition, the electrical connection portion 31 is bent and deformed as the relay terminal connection portion 22 is inserted, and a reaction force (spring force) thereof is applied to a flat surface of the relay terminal connection portion 22 to clamp the relay terminal connection portion 22 between the electrical connection portion 31 and the inner wall surface of the terminal body 32 (FIG. 4). Therefore, the relay terminal connection portion 22 is physically and electrically connected to the relay terminal fitting 30 by the spring force of the relay terminal fitting 30 applied to the flat surface. Here, the relay terminal connection portion 22 is clamped between a bulging portion 33 bulging from the inner wall surface of the terminal body 32 and the electrical connection portion 31. The electrical connection portion 31 illustrated here is formed in a U shape sandwiched between the bus bar terminal connection portion 12A and the relay terminal connection portion 22 in the cylinder of the terminal body 32, and applies the reaction forces (spring forces) in opposite directions to the bus bar terminal connection portion 12A and the relay terminal connection portion 22.

As described above, the electrical connection box 1 includes the housing 40 that houses the bus bar 10, the relay component 20, and the relay terminal fitting 30. The housing 40 includes a case member 50 and a cover member 60 which are formed of an insulating material such as a synthetic resin and are assembled to each other (FIG. 1).

A housing chamber (hereinafter, referred to as a "bus bar housing chamber") 51 that houses the bus bar 10 is formed in the case member 50 (FIGS. 1 and 3). The bus bar 10 is housed in the bus bar housing chamber 51 in a state in which the relay terminal fitting 30 is assembled to the bus bar terminal connection portion 12A. Therefore, the relay terminal fitting 30 is also housed in the bus bar housing chamber 51.

The cover member 60 covers the bus bar 10 and the case member 50 by being assembled to the case member 50. The cover member 60 illustrated here covers the bus bar 10 and the relay terminal fitting 30. Therefore, the cover member 60 has a through-hole for inserting the relay terminal connection portion 22 into the relay terminal fitting 30. In the cover member 60, a standing wall surrounding the through-hole is provided on an outer wall surface, and a space inside the standing wall is used as a housing chamber (hereinafter, referred to as a "relay housing chamber") 61 for the relay component 20 (FIG. 1).

A part of the standing wall of the cover member 60 is cut out, and a holding portion (hereinafter, referred to as a "relay holding portion") 62 that holds the relay component 20 in the relay housing chamber 61 is provided at the cut-out part (FIG. 1). The relay holding portion 62 constitutes a so-called locking mechanism that holds a claw portion 23 by being hooked on the claw portion 23 protruding from an outer wall surface of the relay body 21 (FIG. 1).

In the housing 40, the case member 50 does not include a holding mechanism that holds the bus bar 10 in the bus bar housing chamber 51 (for example, a mechanism in which a through-hole is provided in the bus bar 10, a claw portion to be inserted into the through-hole is provided on a standing wall of the bus bar housing chamber 51, and the claw portion is hooked on a peripheral edge of the through-hole to hold the bus bar 10 in the bus bar housing chamber 51). However, in the housing 40, the bus bar 10 is indirectly held with respect to the cover member 60 via the relay component 20 held by the cover member 60 and the relay terminal fitting 30 to which the relay terminal connection portion 22 of the relay component 20 is fitted and connected.

Meanwhile, in the relay component 20, vibration is caused by an on/off switching operation, and the vibration is transmitted to the relay terminal connection portion 22. The vibration accompanying the driving of the relay component 20 is transmitted from the relay terminal connection portion 22 to the bus bar terminal connection portion 12A via the relay terminal fitting 30, and is transmitted from the bus bar terminal connection portion 12A to the bus bar base portion 11. Since the bus bar 10 is not fixed to the case member 50, when the vibration of the relay component 20 is propagated to the bus bar base portion 11, there is a possibility that abnormal noise occurs due to the vibration of the bus bar base portion 11. In addition, even when the bus bar 10 in the bus bar housing chamber 51 is held by the case member 50 using the holding mechanism described above, the holding mechanism is provided with play (slack) between the claw portion and the through-hole, so that the bus bar 10 can be relatively moved with respect to the case member 50 in the bus bar housing chamber 51 by the degree of play. Therefore, even in a case where the bus bar 10 is held by the case member 50 using the holding mechanism, when the vibration of the relay component 20 is propagated to the bus bar base portion 11, the vibration of the bus bar base portion 11 may cause abnormal noise.

Therefore, in the present embodiment, at least one of the bus bar 10 and the housing 40 is formed as described below, so that the occurrence of abnormal noise caused by the vibration accompanying the driving of the relay component 20 is suppressed. Specifically, at least one vibration damping portion that damps the vibration accompanying the driving of the relay component 20 propagated to the bus bar base portion 11 via the bus bar terminal connection portion 12A is provided in at least one of the bus bar 10 and the housing 40. Then, the bus bar base portion 11 is sandwiched between the case member 50 and the cover member 60 via the vibration damping portion. As a result, in the electrical connection box 1, the vibration accompanying the driving of the relay component 20 propagated to the bus bar base portion 11 via the bus bar terminal connection portion 12A is absorbed and damped by the vibration damping portion, and the vibration of the bus bar base portion 11 can be suppressed.

Although described in detail below, in the electrical connection box 1 exemplified here, the vibration damping portion is provided in any one of the bus bar base portion 11 and the cover member 60, and the bus bar base portion 11 is sandwiched between the case member 50 and the cover member 60 via the vibration damping portion.

A position where the vibration damping portion is disposed is determined as follows. Here, an equivalent radiation power level of a bus bar 10conv according to the related art is obtained by simulation analysis (a line with alternating long and two short dashes in FIGS. 5 to 7). In the bus bar 10conv according to the related art, the vibration damping portion is not provided, and the relay component 20 is assembled to the bus bar terminal connection portion 12A via the relay terminal fitting 30. A result of the analysis indicates that, in the bus bar 10conv according to the related art, the vibration occurs in the vicinity of the bus bar terminal connection portion 12A (that is, the vicinity of a vibration input portion of the relay component 20 in the bus bar base portion 11) in the bus bar base portion 11. Therefore, in the electrical connection box 1 of the present embodiment, the vibration damping portion is disposed such that the vicinity of the bus bar terminal connection portion 12A in the bus bar base portion 11 (that is, the vicinity of the vibration input portion of the relay component 20 in the bus bar base portion 11) is sandwiched between the case member 50 and the cover member 60. In this example, the vibration damping portion is provided at a position and in a quantity where the equivalent radiation power level is lowered at a specific frequency (a frequency of the vibration accompanying the driving of the relay component 20) Fs.

Figure 8:
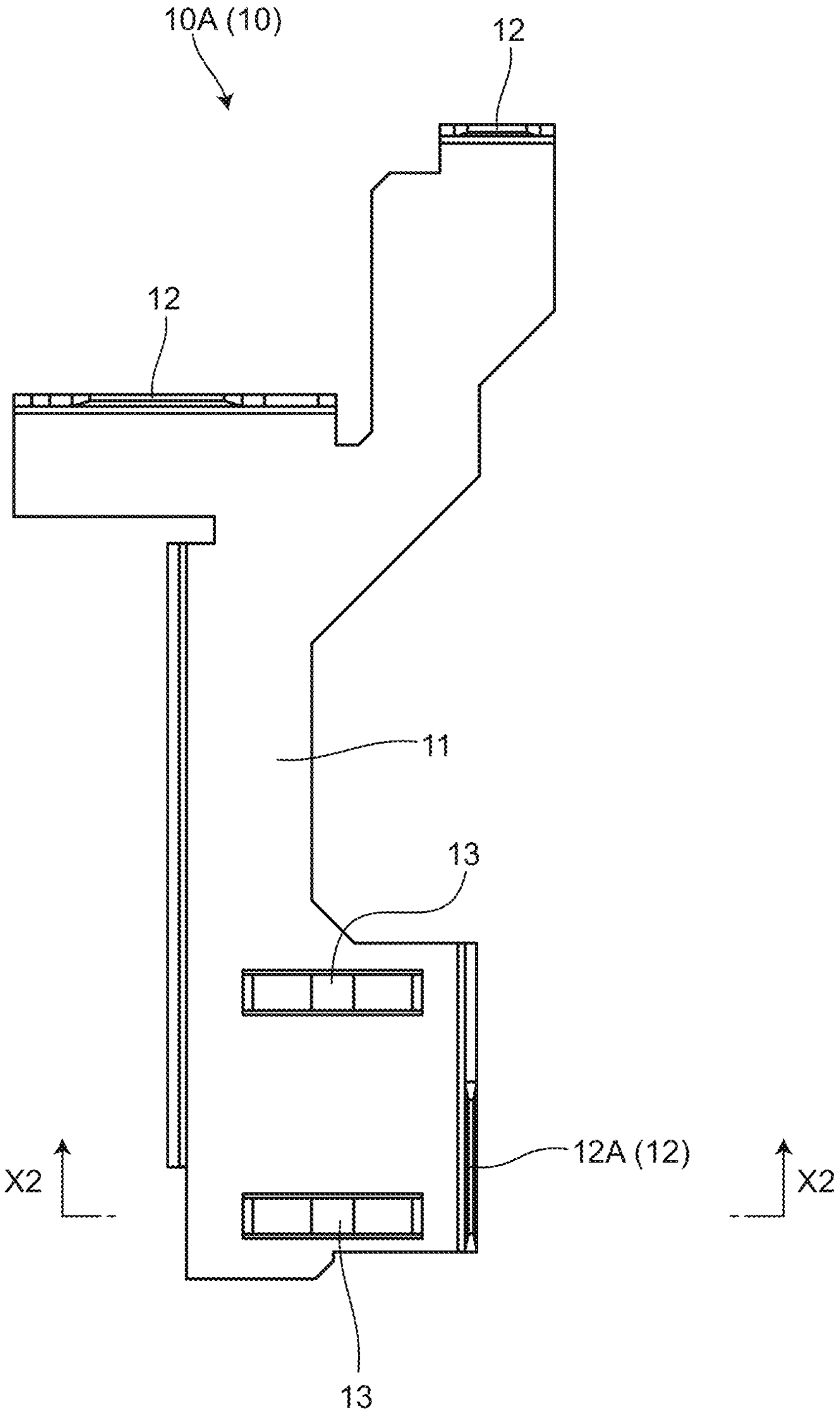
FIG. 8 is a plan view illustrating an example of the bus bar in which the vibration damping portion is provided.
Figure 9:
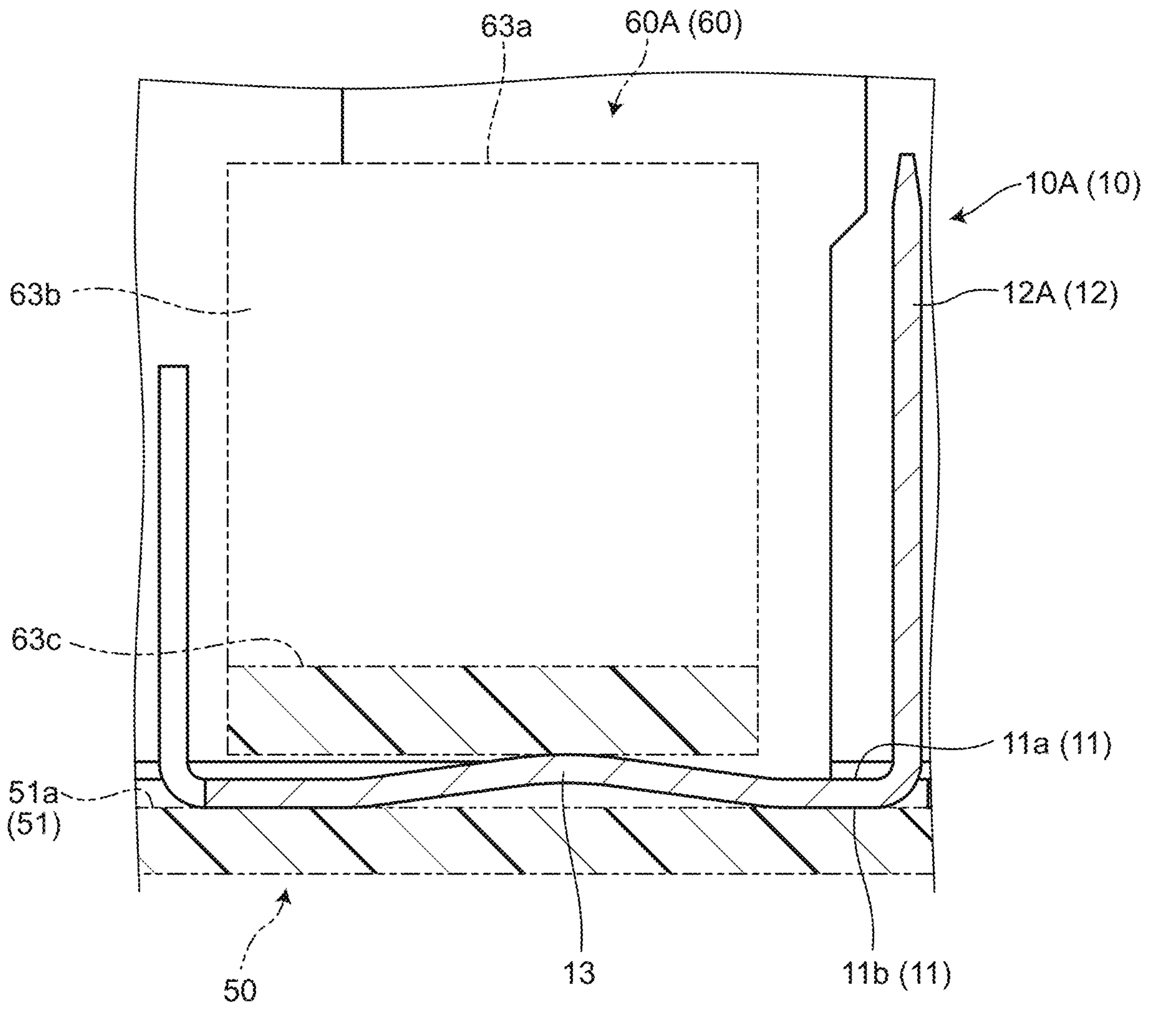
FIG. 9 is a cross-sectional view taken along line X2-X2 of FIG. 8, and illustrates a state in which the bus bar is clamped between a case member and the cover member.

First, the vibration damping portion provided in the bus bar base portion 11 will be described. FIGS. 8 and 9 illustrate a bus bar 10A including a vibration damping portion 13 provided in a bus bar base portion 11. The vibration damping portion 13 is a spring-shaped portion pressed against a cover member 60 such that the bus bar base portion 11 is sandwiched between a case member 50 and the cover member 60 by a spring force generated between the vibration damping portion 13 and the cover member 60. The vibration damping portion 13 is a spring-shaped portion protruding from a first flat surface 11*a* of the bus bar base portion 11 that faces the cover member 60 toward the cover member 60, and is formed in a double-supported beam shape whose middle portion is pressed against the cover member 60 (FIG. 9). Here, a cover member 60A having a facing wall 63*a* disposed to face the bus bar base portion 11 with a space therebetween, a standing wall 63*b* vertically extending from the facing wall 63*a* toward the bus bar base portion 11, and a facing wall (hereinafter, referred to as "adjacent facing wall") 63*c* that is provided adjacent to the vibration damping portion 13 via the standing wall 63*b* and is closer to the bus bar base portion 11 than the facing wall 63*a* is used (FIG. 9). Therefore, the vibration damping portion 13 is a spring-shaped portion protruding from the first flat surface 11*a* facing the adjacent facing wall 63*c* of the bus bar base portion 11 toward the adjacent facing wall 63*c*, and is formed in a double-supported beam shape such that the middle portion is pressed against the adjacent facing wall 63*c*. The middle portion of the vibration damping portion 13, which is a portion pressed against the cover member 60A, is pressed against the adjacent facing wall 63*c* of the cover member 60A to generate the spring force between the vibration damping portion 13 and the cover member 60A, and a second flat surface 11*b* of the bus bar base portion 11 that faces a bottom surface 51*a* of a bus bar housing chamber 51 is pressed against the bottom surface 51*a*. Therefore, the bus bar base portion 11 is sandwiched between the bottom surface 51*a* of the bus bar housing chamber 51 and the adjacent facing wall 63*c* of the cover member 60A via the vibration damping portion 13. In addition, in this example, the vibration damping portion 13 is provided at each of two positions in the bus bar base portion 11, and the vibration is damped at each position where the vibration damping portion 13 is provided. A solid line in FIG. 5 indicates an equivalent radiation power level of the bus bar 10A in which the vibration damping portion 13 is provided. The equivalent radiation power level of the bus bar 10A at the specific frequency Fs can be lower than that of the bus bar 10conv according to the related art to which the vibration damping portion 13 is not applied.

Figure 10:
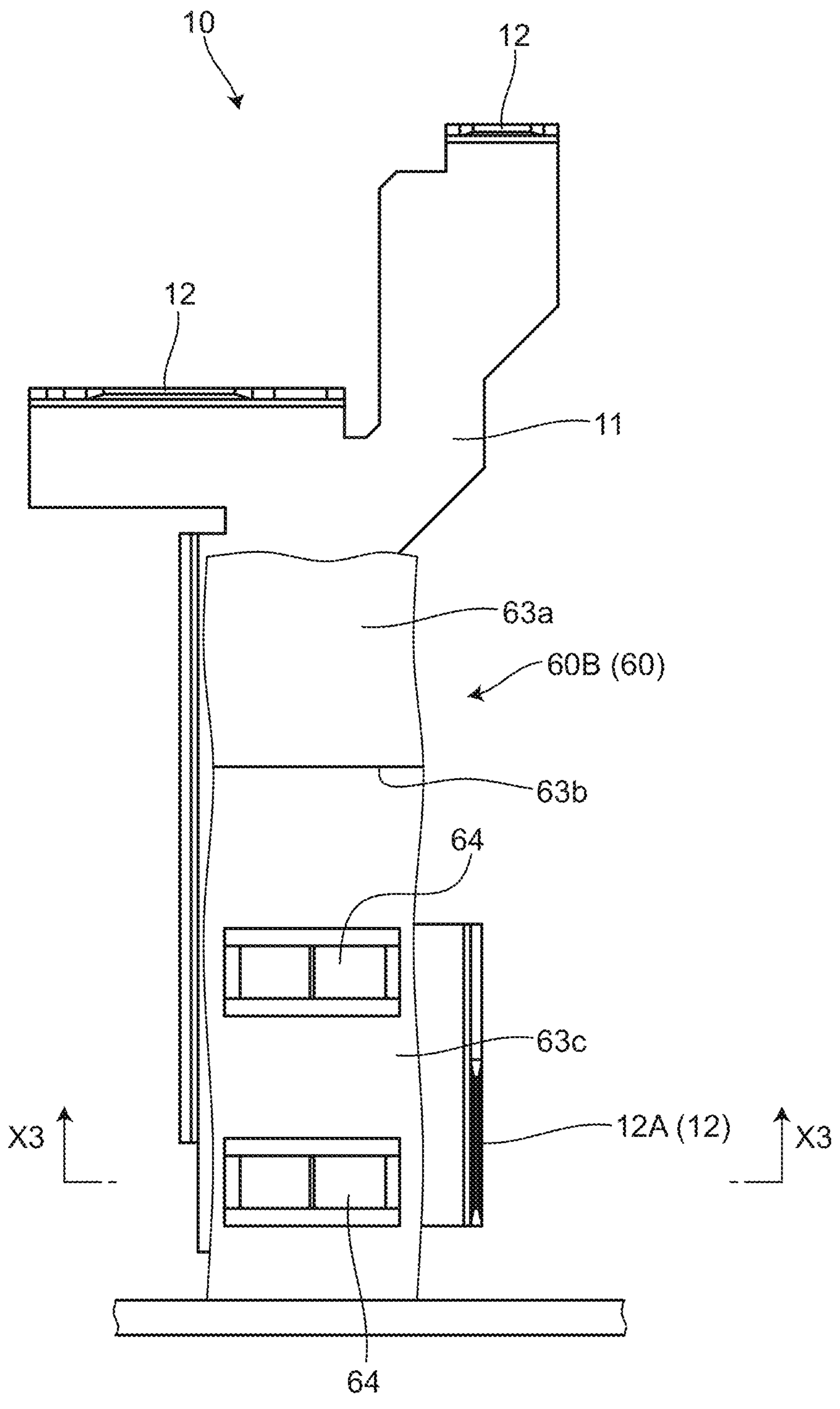
FIG. 10 is a plan view illustrating a part of an example of the cover member in which the vibration damping portion is provided.
Figure 11:
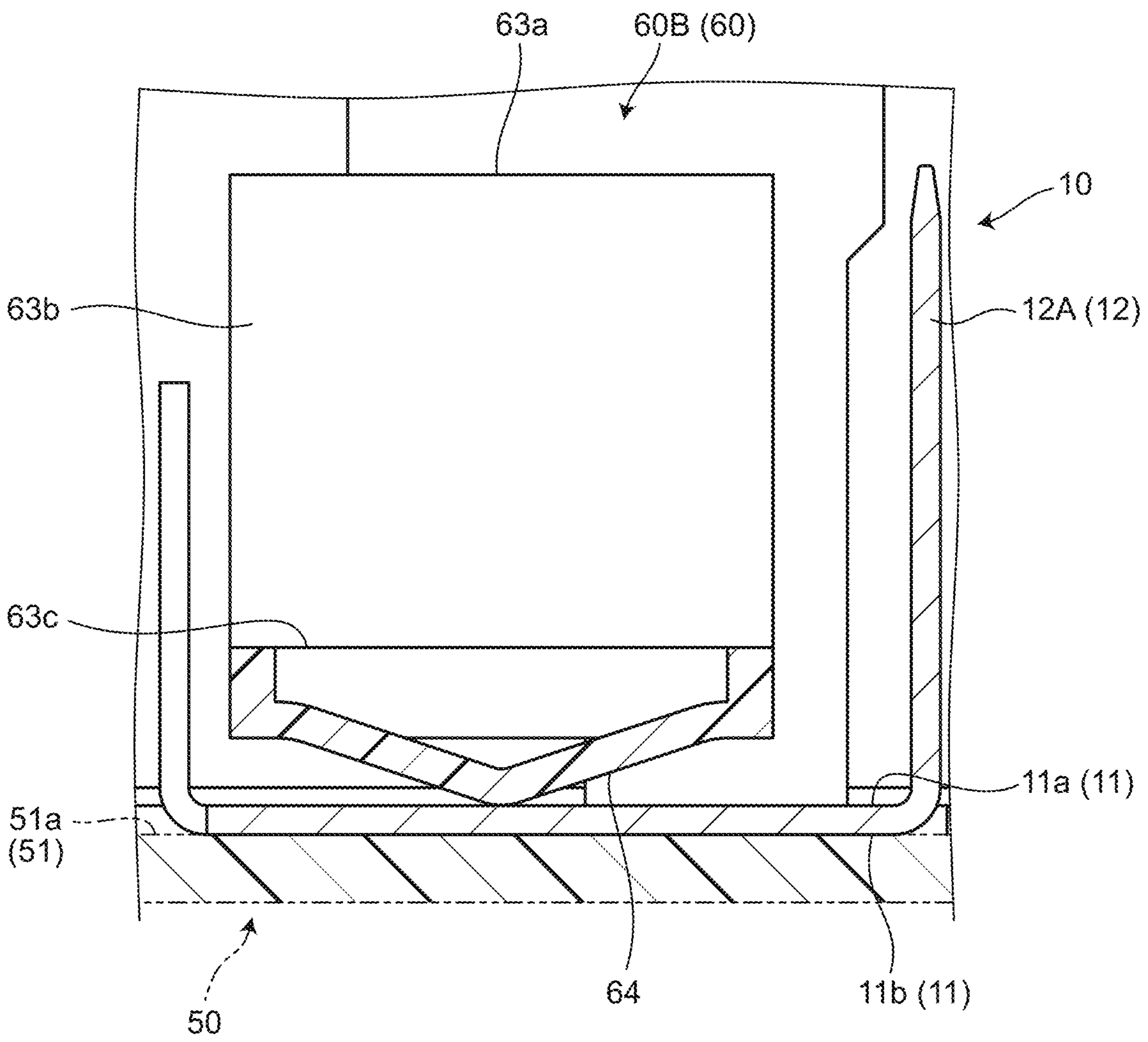
FIG. 11 is a cross-sectional view taken along line X3-X3 of FIG. 10, and illustrates a state in which the bus bar is clamped between the case member and the cover member.

Next, the vibration damping portion provided in the cover member 60 will be described. The bus bar 10 used here is molded in the same shape as the bus bar 10conv according to the related art. FIGS. 10 and 11 illustrate a cover member 60B in which a vibration damping portion 64 is provided. Similarly to the cover member 60A, the cover member 60B has a facing wall 63*a*, a standing wall 63*b*, and an adjacent facing wall 63*c*. The vibration damping portion 64 is a spring-shaped portion pressed against a bus bar base portion 11 such that the bus bar base portion 11 is sandwiched between a case member 50 and the cover member 60B by a spring force generated between the vibration damping portion 64 and the bus bar base portion 11. The vibration damping portion 64 is a spring-shaped portion protruding from the adjacent facing wall 63*c* of the cover member 60B toward the bus bar base portion 11, and is formed in a double-supported beam shape whose middle portion is pressed against the bus bar base portion 11 (FIG. 11). The middle portion of the vibration damping portion 64, which is a portion pressed against the bus bar base portion 11, is pressed against a first flat surface 11*a* of the bus bar base portion 11 to generate the spring force between the vibration damping portion 64 and the bus bar base portion 11, and a second flat surface 11*b* of the bus bar base portion 11 is pressed against a bottom surface 51*a* of a bus bar housing chamber 51. Therefore, the bus bar base portion 11 is sandwiched between the bottom surface 51*a* of the bus bar housing chamber 51 and the cover member 60B via the vibration damping portion 64. In this example, the vibration damping portion 64 is provided at each of two positions in the cover member 60B, and the vibration is damped at each position on the bus bar base portion 11 with which the vibration damping portion 64 is in contact. A solid line in FIG. 6 indicates an equivalent radiation power level of the bus bar 10 when the vibration damping portion 64 is used. The equivalent radiation power level of the bus bar 10 at the specific frequency Fs can be lower than that of the bus bar 10conv according to the related art to which the vibration damping portion 64 is not applied.

Figure 12:
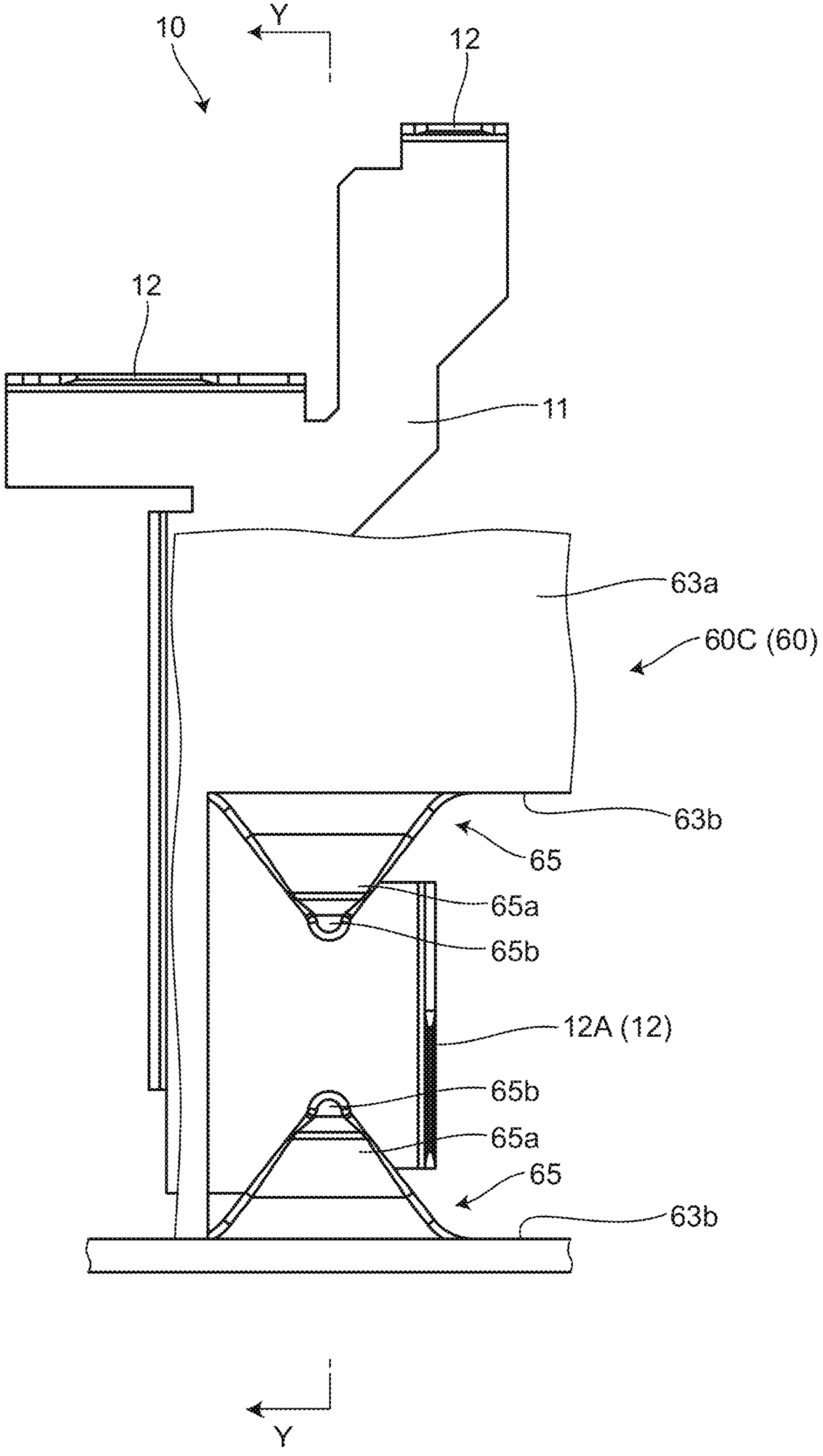
FIG. 12 is a plan view illustrating a part of an example of the cover member in which the vibration damping portion of another form is provided.
Figure 13:
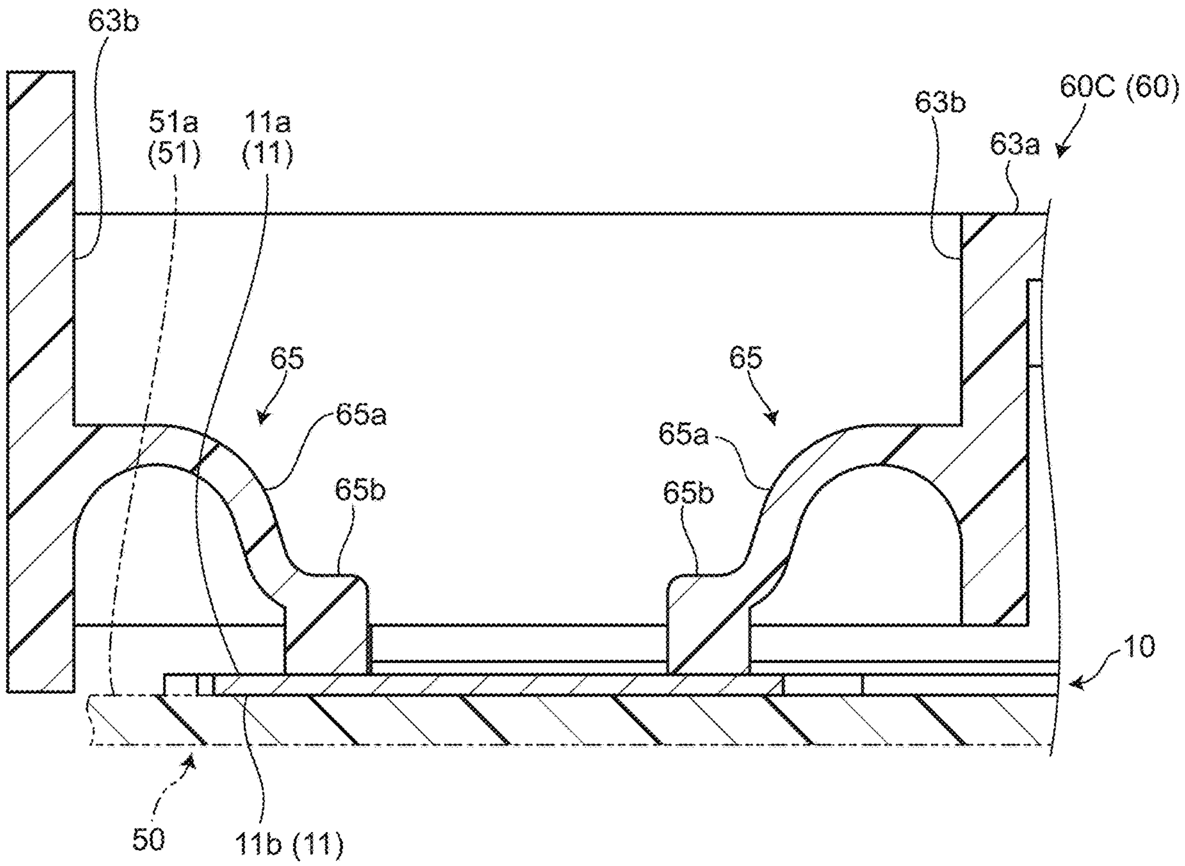
FIG. 13 is a view illustrating a cross section taken along line Y-Y of FIG. 12 rotated by 90 degrees, and illustrates a state in which the bus bar is clamped between the case member and the cover member.

Next, another form of the vibration damping portion provided in the cover member 60 will be described. The bus bar 10 used here is molded in the same shape as the bus bar 10conv according to the related art. FIGS. 12 and 13 illustrate a cover member 60C in which a vibration damping portion 65 is provided. The cover member 60C has a facing wall 63*a* and a standing wall 63*b* similarly to the cover member 60A, but does not have the adjacent facing wall 63*c*. Similarly to the vibration damping portion 64, the vibration damping portion 65 is a spring-shaped portion pressed against a bus bar base portion 11 such that the bus bar base portion 11 is sandwiched between a case member 50 and the cover member 60C by a spring force generated between the vibration damping portion 64 and the bus bar base portion 11. However, the vibration damping portion 65 is a spring-shaped portion formed in a cantilever shape whose free end portion is pressed against the bus bar base portion 11 (FIG. 13). For example, in the cover member 60C, the vibration damping portion 65 protrudes from a wall surface of the standing wall 63*b*. The vibration damping portion 65 includes a flexible portion 65*a* that protrudes from the wall surface of the standing wall 63*b* and is bendable and deformable, and a pressing portion 65*b* that is provided at a free end of the flexible portion 65*a* and can be pressed against the bus bar base portion 11 at an assembly completion position of the case member 50 and the cover member 60 (FIGS. 12 and 13). The flexible portion 65*a* is bent and deformed in an attachment/detachment direction of the cover member 60C with respect to the case member 50. The pressing portion 65*b* of the vibration damping portion 65, which is a portion pressed against the bus bar base portion 11, is pressed against a first flat surface 11*a* of the bus bar base portion 11 to generate the spring force between the vibration damping portion 64 and the bus bar base portion 11, and a second flat surface 11*b* of the bus bar base portion 11 is pressed against a bottom surface 51*a* of a bus bar housing chamber 51. Therefore, the bus bar base portion 11 is sandwiched between the bottom surface 51*a* of the bus bar housing chamber 51 and the cover member 60C via the vibration damping portion 65. In this example, the vibration damping portion 65 is provided at each of two positions in the cover member 60C, and the vibration is damped at each position on the bus bar base portion 11 with which the vibration damping portion 65 is in contact. A solid line in FIG. 7 indicates an equivalent radiation power level of the bus bar 10 when the vibration damping portion 65 is used. The equivalent radiation power level of the bus bar 10 at the specific frequency Fs can be lower than that of the bus bar 10conv according to the related art to which the vibration damping portion 65 is not applied.

As described above, in the electrical connection box 1 of the present embodiment, the vibration damping portion 13, 64, or 65 provided in any one of the bus bar base portion 11 and the cover member 60 can damp the vibration accompanying the driving of the relay component 20 propagated to the bus bar base portion 11 via the bus bar terminal connection portion 12A. Therefore, the electrical connection box 1 can suppress the vibration of the bus bar 10 (10A) and can suppress occurrence of abnormal sound caused by the vibration of the bus bar 10 (10A). Further, in the electrical connection box 1, when the relay terminal fitting 30 absorbs and damps the vibration accompanying the driving of the relay component 20, it is possible to suppress the propagation of the vibration to the bus bar base portion 11, so that it is possible to further suppress the occurrence of abnormal noise caused by the vibration of the bus bar 10 (10A). On the other hand, in the electrical connection box 1, the vibration damping portion 13, 64, or 65 is provided at an appropriate position, so that it is possible to suppress the vibration of the bus bar 10 (10A) and the occurrence of abnormal noise caused by the vibration even when the relay terminal fitting 30 amplifies the vibration accompanying the driving of the relay component 20.

In addition, since the vibration damping portion 65 has a cantilever shape, the degree of freedom in arrangement of the pressing portion (pressing portion 65*b*) against the bus bar base portion 11 is higher than that of a double-supported beam shape. Therefore, in the electrical connection box 1, the bus bar base portion 11 can be sandwiched at a more appropriate position by applying the vibration damping portion 65 having a cantilever shape, so that it is possible to enhance an effect of suppressing the occurrence of abnormal noise caused by the vibration of the bus bar 10.

Furthermore, since the electrical connection box 1 of the present embodiment can suppress the vibration of the bus bar 10 (10A), it is also possible to suppress abrasion of a contact point between the bus bar terminal connection portion 12A and the relay terminal fitting 30.

In the electrical connection box according to the present embodiment, the vibration damping portion provided in any one of the bus bar base portion and the cover member can damp the vibration accompanying the driving of the relay component propagated to the bus bar base portion via the bus bar terminal connection portion. Therefore, the electrical connection box can suppress the vibration of the bus bar and can suppress occurrence of abnormal noise caused by the vibration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:

a bus bar that includes a bus bar base portion having a flat plate shape, and a bus bar terminal connection portion having a male tab shape erected from the bus bar base portion;

a relay component in which a relay terminal connection portion is provided;

a relay terminal fitting that physically and electrically connects the bus bar terminal connection portion, and that physically and electrically connects the relay terminal connection portion; and a housing that houses the bus bar, the relay component, and the relay terminal fitting, wherein the housing includes a case member in which a bus bar housing chamber that houses the bus bar is formed, and a cover member that covers the bus bar and the case member, at least one vibration damping portion that damps vibration accompanying driving of the relay component propagated to the bus bar base portion via the bus bar terminal connection portion is provided in at least one of the bus bar and the housing, and the bus bar base portion is sandwiched between the case member and the cover member via the vibration damping portion.

2. The electrical connection box according to claim 1, wherein the vibration damping portion is a spring-shaped portion that is provided in the bus bar base portion and pressed against the cover member such that the bus bar base portion is sandwiched between the case member and the cover member by a spring force generated between the vibration damping portion and the cover member.

3. The electrical connection box according to claim 2, wherein the bus bar terminal connection portion is physically and electrically connected to the relay terminal fitting by a spring force of the relay terminal fitting applied to a flat surface of the bus bar terminal connection portion.

4. The electrical connection box according to claim 1, wherein the vibration damping portion is a spring-shaped portion that is provided in the cover member and pressed against the bus bar base portion such that the bus bar base portion is sandwiched between the case member and the cover member by a spring force generated between the vibration damping portion and the bus bar base portion.

5. The electrical connection box according to claim 4, wherein the spring-shaped portion is formed in a double-supported beam shape whose middle portion is pressed against the bus bar base portion.

6. The electrical connection box according to claim 5, wherein the bus bar terminal connection portion is physically and electrically connected to the relay terminal fitting by a spring force of the relay terminal fitting applied to a flat surface of the bus bar terminal connection portion.

7. The electrical connection box according to claim 4, wherein the spring-shaped portion is formed in a cantilever shape whose free end portion is pressed against the bus bar base portion.

8. The electrical connection box according to claim 7, wherein the bus bar terminal connection portion is physically and electrically connected to the relay terminal fitting by a spring force of the relay terminal fitting applied to a flat surface of the bus bar terminal connection portion.

9. The electrical connection box according to claim 4, wherein the bus bar terminal connection portion is physically and electrically connected to the relay terminal fitting by a spring force of the relay terminal fitting applied to a flat surface of the bus bar terminal connection portion.

10. The electrical connection box according to claim 1, wherein the bus bar terminal connection portion is physically and electrically connected to the relay terminal fitting by a spring force of the relay terminal fitting applied to a flat surface of the bus bar terminal connection portion.

* * * * *